US012607206B2

(12) United States Patent
Iotti

(10) Patent No.: US 12,607,206 B2
(45) Date of Patent: Apr. 21, 2026

(54) MOVEMENT CONTROL DEVICE WITH DOUBLE BALANCING

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 0 days.

(21) Appl. No.: 18/882,962

(22) Filed: Sep. 12, 2024

(65) Prior Publication Data

US 2025/0137470 A1 May 1, 2025

(30) Foreign Application Priority Data

Oct. 25, 2023 (IT) ........................ 102023000022317

(51) Int. Cl.
*F15B 13/04* (2006.01)

(52) U.S. Cl.
CPC . *F15B 13/0401* (2013.01); *F15B 2211/30505* (2013.01); *F15B 2211/3058* (2013.01); *F15B 2211/329* (2013.01); *F15B 2211/55* (2013.01); *F15B 2215/30* (2013.01)

(58) Field of Classification Search
CPC .................. F15B 13/02; F15B 13/0401; F15B 2211/30505; F15B 2211/3058; F15B 2211/329; F15B 2211/55; F15B 2211/5059; F15B 2211/7053; F15B 2211/8757; F15B 2211/50; F15B 2215/30; F15B 20/008; F15B 11/0445; F15B 11/032; F15B 19/00
See application file for complete search history.

(56) References Cited

U.S. PATENT DOCUMENTS 3,330,531 A * 7/1967 Slator .................... E21B 19/084 137/596.13
3,435,838 A * 4/1969 Bower .................. E01C 19/202 137/115.06
4,696,163 A * 9/1987 Glomeau ................ F15B 13/01 60/390

(Continued)

FOREIGN PATENT DOCUMENTS

KR 101182717 9/2012

OTHER PUBLICATIONS

Translation of KR 101182717, Year 2012.*
Italian Search report issued in IT 202300022317 on Apr. 17, 2024, 6 pages.

*Primary Examiner* — William M Mccalister
(74) *Attorney, Agent, or Firm* — Chrisman Gallo Tochtrop LLC

(57) ABSTRACT

A device for controlling movement of a load. The device includes a first conduit, designed to be connected to a first chamber of a hydraulic actuator, a second conduit designed to be connected to a second chamber of the hydraulic actuator, a first balancing valve, positioned along the first conduit, which is normally closed and is actuated towards an open position by the pressure present in the second conduit, a second balancing valve, positioned along the second conduit, which is normally closed and is controlled towards an open position by the pressure present in the first conduit, and a third balancing valve, positioned along the first conduit, which is normally closed and is actuated towards an open position by the pressure present in the second conduit.

9 Claims, 3 Drawing Sheets

(56) References Cited

U.S. PATENT DOCUMENTS

| | | | | |
|---|---|---|---|---|
| 4,732,076 | A * | 3/1988 | Ewald | F15B 11/003 60/460 |
| 2003/0084663 | A1* | 5/2003 | Heyne | B60T 17/04 60/468 |
| 2006/0026955 | A1 | 2/2006 | Bogelein | |
| 2012/0260641 | A1* | 10/2012 | Opdenbosch | F15B 7/006 60/470 |
| 2013/0098018 | A1* | 4/2013 | Knussman | E02F 9/2242 60/428 |
| 2014/0033689 | A1* | 2/2014 | Opdenbosch | E02F 9/2217 60/325 |
| 2018/0112686 | A1* | 4/2018 | Roberti | F15B 11/003 |
| 2021/0071689 | A1 | 3/2021 | Xu | |
| 2023/0049370 | A1* | 2/2023 | Fukuda | E02F 9/2235 |

* cited by examiner

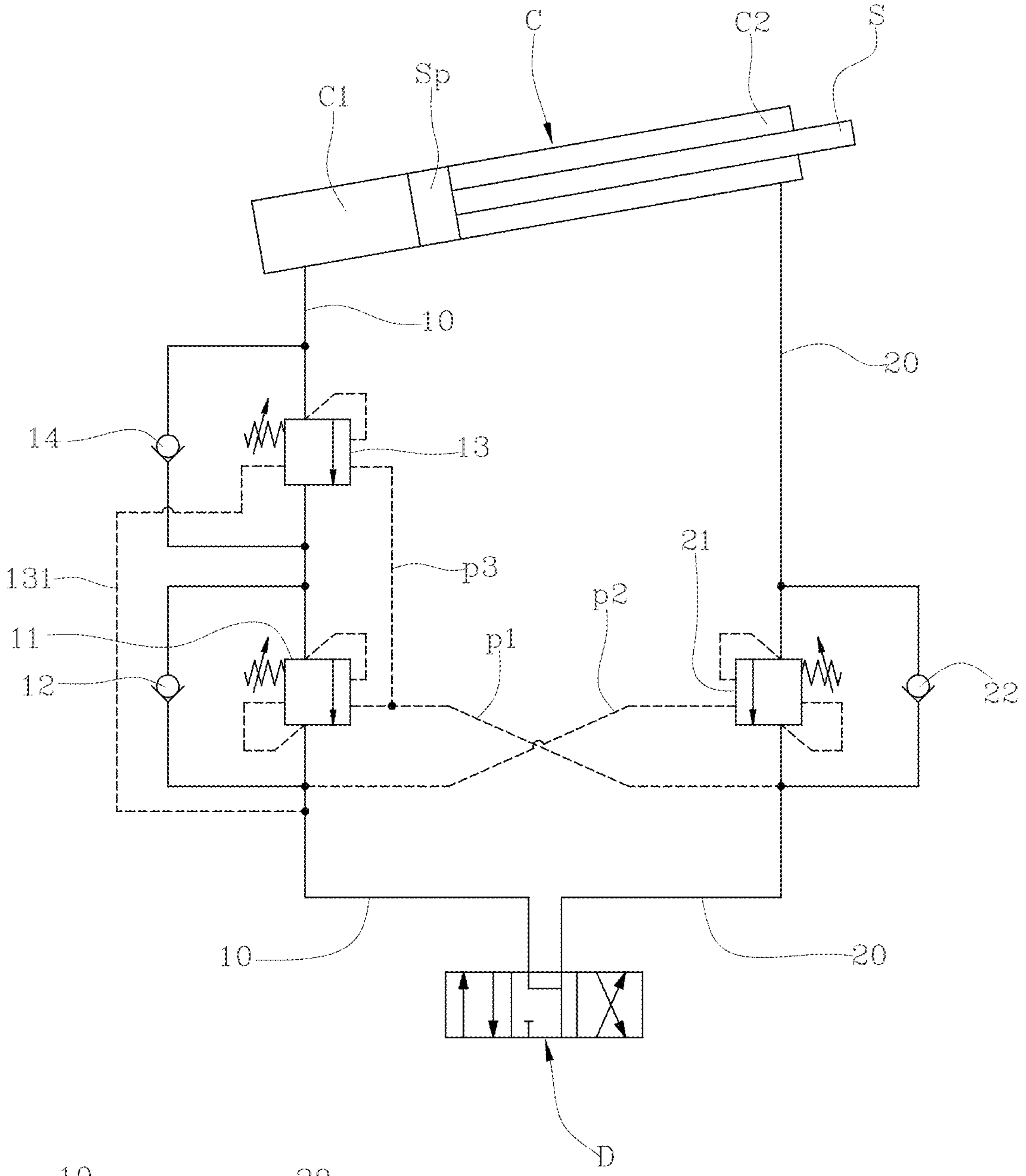
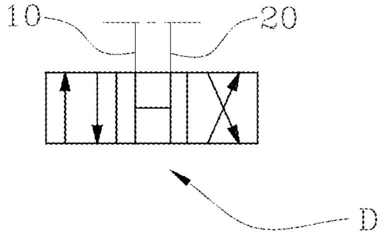
Fig.1a
Fig.1

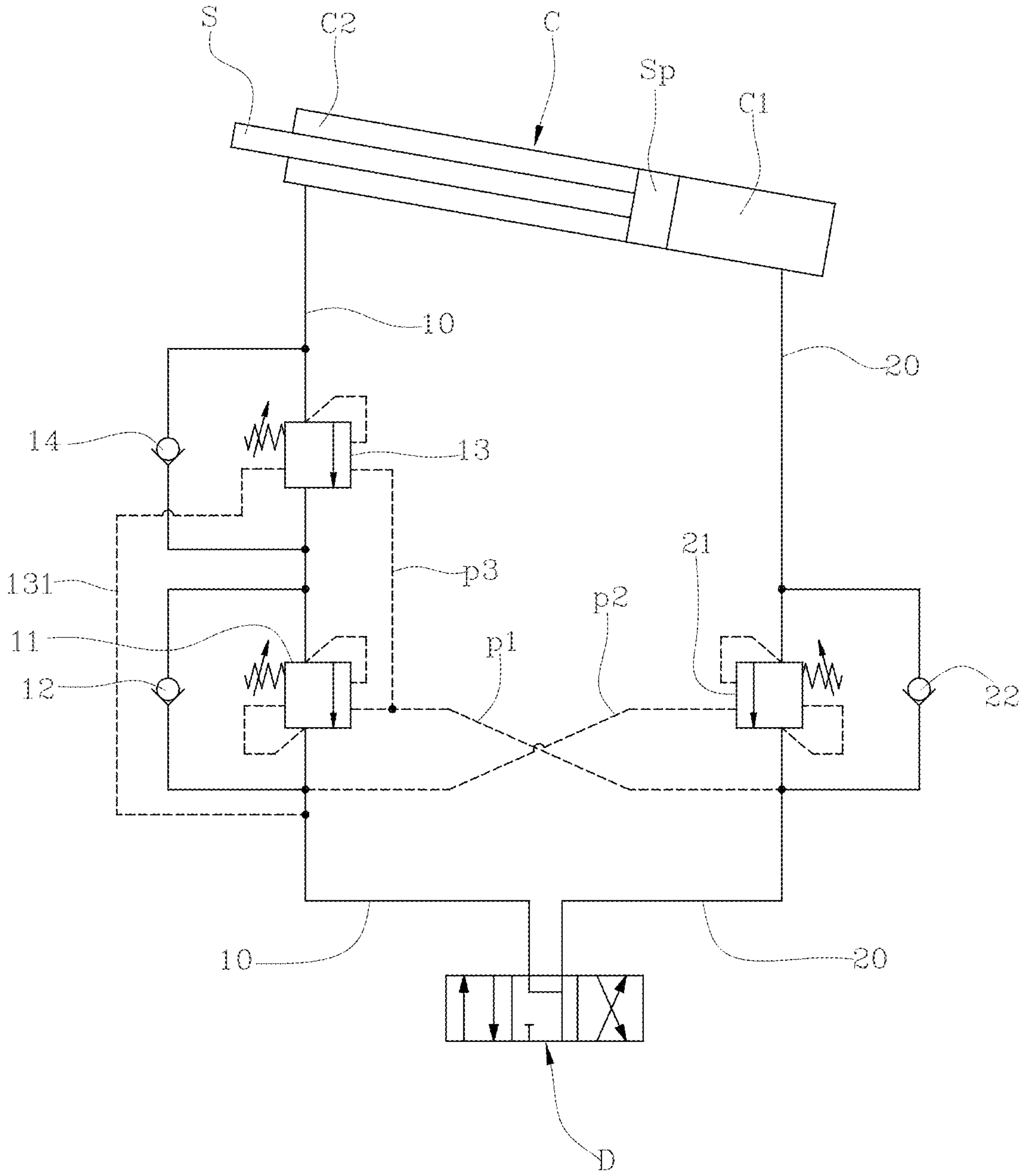
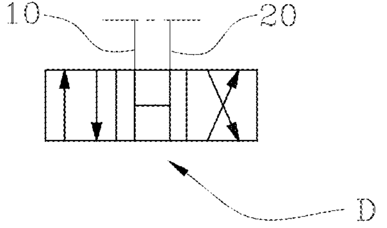
Fig.2a
Fig.2

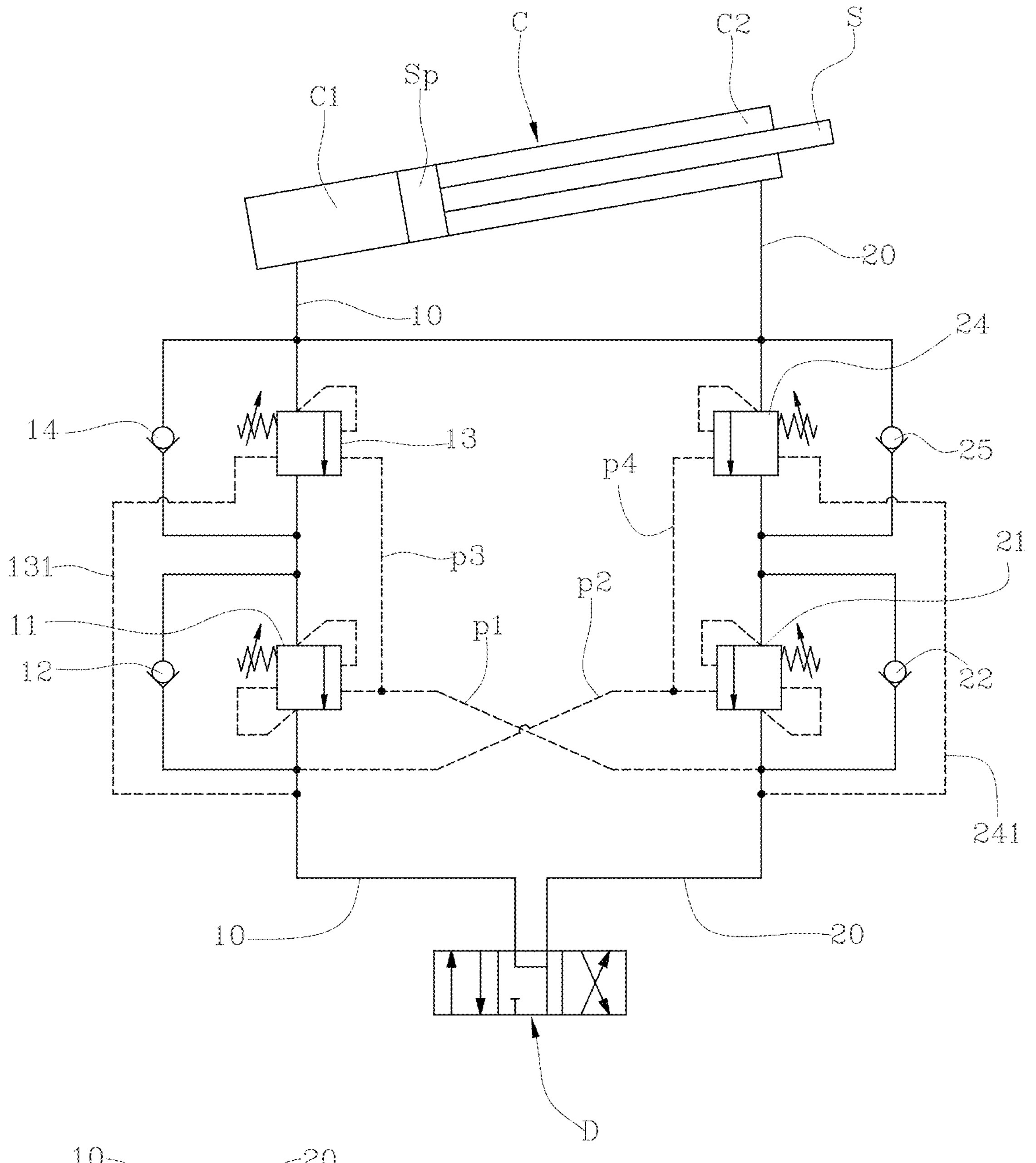
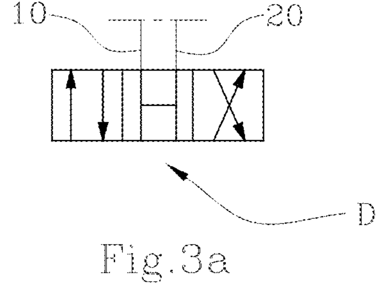
Fig.3a
Fig.3

MOVEMENT CONTROL DEVICE WITH DOUBLE BALANCING

This invention relates to a device for controlling movement with balancing of the load on each chamber of an actuator.

More in detail, the invention relates especially, even if not exclusively, to a telescopic handler.

There are prior art telescopic handlers consisting of a vehicle provided with a frame, or "carriage," movable on wheels, of a driver's cab which houses the operator and a manoeuvring arm which can be extended for lifting and lowering a load.

In some models, the manoeuvring arm is hinged directly to the carriage, whilst other models are provided with a platform, or "turret", mounted rotatably on the carriage, which has the cab and to which the manoeuvring arm is hinged.

Generally speaking, the lifting systems are driven by one or more hydraulic cylinders.

Each cylinder may be fed with pressurised fluid, typically oil, from the side of the base or from the side of the rod. The feeding from the side of the base, in combination with the discharging of the fluid on the side of the rod, determines an outfeed movement of the rod and the lifting of the load. The feeding from the side of the rod and/or the discharging of the fluid from the side of the base determines a withdrawal movement of the rod and the lowering of the load.

There is a control valve on the conduit which feeds the operating oil to the base side of the cylinder. The purpose of the control valve is to allow the free feeding of the operating fluid to the base side of the cylinder, if the outfeed movement of the rod and the lifting of the load is to be determined, and to control or block the discharging of the operating fluid from the base side of the cylinder if the re-entry of the rod and the lowering of the load is to be performed.

In particular, the control valve is a valve normally closed and controlled during opening by a control pressure. In the absence of a control pressure, the valve remains closed and prevents the discharge of the operating fluid, in such a way as to guarantee the support of the load and prevent an uncontrolled descent of the load. In the presence of a control pressure, the valve opens in a controlled manner allowing the discharge of the operating fluid and the consequent controlled lowering of the load. In many cases, the control pressure is picked up from the conduit which feeds the operating oil to the rod side of the cylinder.

The feeding of the operating fluid to the base side or to the rod side of the cylinder is normally established by means of a distributor which has a central position, in which the operating fluid is not fed to the cylinder, a first position, in which the operating fluid is fed to the base side of the cylinder, whilst the rod side is connected to a discharge, and a second position, in which the operating fluid is fed to the rod side of the cylinder, whilst the base side is connected to the discharge through the control valve.

In many cases, the central position of the distributor provides for the discharge of both the connecting conduit to the base side of the cylinder and of the connecting conduit to the rod side of the cylinder.

The central position of the distributor is typically associated with an absence of control by the operator. In this condition, the load must be kept in the position in which it is located. For this to occur and, in particular, so that the load does not lower uncontrollably, the fluid present in the base side of the cylinder must not be able to discharge. The task of preventing the discharge of the fluid from the base side of the cylinder is entrusted to the lowering control valve positioned along the connecting conduit of the base side of the cylinder. As already mentioned, the lowering control valve is normally closed, that is to say, it adopts a closed position in the absence of a lowering command. When it is in the closed position, the lowering control valve prevents the discharge of the operating fluid from the base side of the cylinder, and therefore allows the load to be kept in a stationary position.

The current solutions have a quite significant drawback, determined by the possibility that the lowering control valve does not adopt a complete closing position, but remains partly open, allowing the discharge of the fluid from the base side of the cylinder. This occurs, for example, in the presence of free particles inside the base side of the cylinder, resulting from the mechanical processing.

In these conditions, an uncontrolled and unexpected movement of the load occurs, since it occurs in the absence of a precise command by the operator. An uncontrolled movement of the load is, in itself, a dangerous event.

The aim of this invention is to provide a movement control device which overcomes the drawback briefly described above.

The main advantage of the movement control device according to this invention is that it makes the risk of an uncontrolled descent of the load substantially negligible.

Further features and advantages of the invention are more apparent from the detailed description which follows of an embodiment of the invention, illustrated by way of a non-limiting example in the accompanying drawings, in which:

FIG. 1 schematically illustrates an embodiment of the movement control device according to this invention;

FIG. 1*a* schematically illustrates a variant of the embodiment of FIG. 1;

FIG. 2 illustrates a second embodiment of the movement control device according to this invention;

FIG. 2*a* schematically illustrates a variant of the embodiment of FIG. 2;

FIG. 3 illustrates a third embodiment of the movement control device according to this invention;

FIG. 3*a* schematically illustrates a variant of the embodiment of FIG. 3.

As already mentioned, the movement control device according to this invention is particularly useful on board an operator vehicle such as a telescopic handler, or telehandler.

There are prior art telescopic handlers consisting of a vehicle provided with a frame, or "carriage," movable on wheels, of a driver's cab which houses the operator and a manoeuvring arm which can be extended for lifting and lowering a load.

In some models, the manoeuvring arm is hinged directly to the carriage, whilst other models are provided with a platform, or "turret", mounted rotatably on the carriage, which has the cab and to which the manoeuvring arm is hinged.

The hydraulic actuators are supplied by means of a control circuit comprising valves and distributors which direct the operating fluid to the various actuators, as a function of specific activation commands which may be automatic or imparted by an operator by means of suitable control elements.

In the following description, the term "balancing valve" means a device designed to control the flow flowing out from an actuator, through the movement of a shutter, that is to say, an element which is movable in a seat between a closed position, in which it prevents the flow through the valve and, therefore, along the conduit in which the valve is installed, and at least one open position, in which it allows the flow through the valve and, therefore, along the conduit in which the valve is installed.

Indicating an open position or configuration of a valve means a configuration wherein the shutter is in the open position.

Indicating a closed position or configuration of a valve means a configuration wherein the shutter is in the closed position.

Indicating an opening command means an action which causes the movement of the shutter towards the open position.

Indicating a closing command means an action which causes the movement of the shutter towards the closed position.

The expression "hydraulic control valve" is used to mean a valve provided with at least a first control conduit, that is to say, a conduit which transmits to the shutter a first control pressure which pushes it towards the open position or towards the closed position. Elastic means acts in opposition to the thrust exerted by the control pressure to move the shutter in the opposite direction, in the absence of the action exerted by the control pressure. If the elastic means is positioned in such a way as to move the shutter towards the closed position, the valve will be defined as "normally closed".

In combination with or as an alternative to the elastic means, the valve may comprise a second control conduit, that is to say, a conduit which transmits to the shutter a second control pressure which pushes it in the opposite direction with respect to the first control pressure.

Reference will be made in the following description to a hydraulic actuator in the form of a cylinder (C) provided with a rod (S) slidable along an operating direction in and out of the cylinder (C). The hydraulic actuator could, however, be of a different type, for example it could be of the rotary type.

The cylinder (C) is provided with a rod (S) slidable along an operating direction in and out of the cylinder (C). The moving out of the rod is associated with the exerting of an active force, for example the lifting of a load. The re-entry of the rod is associated with the release of the active force, for example the lowering of the load. In known manner, the rod (S) is connected to a piston (Sp) slidable in a sealed fashion in the body of the cylinder (C).

The piston (Sp) divides the inner chamber of the cylinder into a first chamber (C1) and a second chamber (C2).

According to the embodiment illustrated, the first chamber (C1) is located on the side of the base of the cylinder (C). The second chamber (C2) is positioned on the side of the rod of the cylinder (C). Feeding the operating fluid to the first chamber (C1) and allowing the discharge of the operating fluid from the second chamber (C2) produces the increase in volume of the first at the expense of the second chamber, and determines the sliding out of the rod (S). Vice versa, feeding the operating fluid to the second chamber (C2) and allowing the discharge of the operating fluid from the first chamber (C1) produces the increase in volume of the second chamber (C2) at the expense of the first chamber (C1), and determines the sliding re-entry of the rod (S).

In the following description, reference will be made to the case in which the resistant load on the cylinder exerts an action which tends to move the rod (S) in. The solution according to this invention, suitably configured, can in any case be adopted even if the resistant load on the cylinder exerts an action which tends to move the rod (S) out, or if the cylinder (C) has two resistant loads, one which exerts an action that tends to move the rod (S) in, the other opposite, which exerts an action which tends to move the rod (S) out.

The control circuit of the cylinder (C) comprises a four-way, three-position distributor (D). The distributor (D) has a central position, in which the fluid is not sent to the cylinder, a first position, in which the fluid is sent to the first chamber (C1), whilst the second chamber (C2) is connected to a discharge, and a second position, in which the fluid is sent to the second chamber (C2) of the cylinder, whilst the first chamber (C1) is connected to the discharge.

According to the embodiment illustrated in FIGS. 1, 2, 3, the central position of the distributor (D) connects to the discharge both the first chamber (C1) and the second chamber (C2), in a so-called "Y" configuration, wherein both the connections to the chambers (C1, C2) converge to a single discharge. The invention is particularly advantageous if the distributor (D) has a central position wherein both connections are connected to a discharge by means of a relative outlet, in a so-called "H" configuration, shown in FIGS. 1*a*, 2*a*, 3*a*.

The movement control device according to this invention comprises a first conduit (10), designed to be connected to a first chamber (C1) of the hydraulic actuator (C).

The device also comprises a second conduit (20), designed to be connected to a second chamber (C2) of the hydraulic actuator (C).

The first and second conduits (10, 20) are designed to also connect to the distributor (D), that is to say, they are designed to connect the distributor (D) respectively to the first chamber (C1) and to the second chamber (C2).

A first balancing valve (11) is positioned along the first conduit (10). The first balancing valve (11) is normally closed and is actuated towards an open position by the pressure present in the second conduit (20).

A second balancing valve (21) is positioned along the second conduit (20). The second balancing valve (21) is normally closed and is controlled towards an open position by the pressure present in the first conduit (10).

Each balancing valve (11, 21) comprises a respective by-pass (12, 22), configured for allowing the direct flow towards the hydraulic actuator (C) and for preventing the opposite flow.

The feeding of operating fluid to the first or to the second conduit (10, 20) determines the filling and the increase in volume, respectively, of the first or second chamber (C1, C2), with a reduction in the volume of the other chamber. In the case of the hydraulic cylinder (C), feeding the operating fluid to the first conduit (10) determines the increase in volume of the first chamber (C1) and the reduction in volume of the second chamber (C2), with the discharging of operating fluid from the latter.

The operating fluid fed to the first conduit (10) reaches the first chamber (C1) passing through the by-pass (12) of the first balancing valve (11). In effect, the latter is in the closed position. The discharge of the operating fluid from the second chamber (C2) occurs through the second balancing valve (20), which moves to the open position due to the effect of the pressure present in the first conduit (C1).

Similarly, the operating fluid fed to the second conduit (20) reaches the second chamber (C2) passing through the by-pass (21) of the second balancing valve (21). In effect, the latter is in the closed position. The discharge of the operating fluid from the first chamber (C1) occurs through the first balancing valve (10), which moves to the open position due to the effect of the pressure present in the second conduit (C2).

According to the embodiment illustrated, the sending of the operating fluid to the first chamber (C1) or to the second chamber (C2) occurs by moving the distributor (D) to the first or to the second position. Typically, the movement of the distributor is performed by an operator using a special control unit, known in the sector. The sending of the operating fluid to the first chamber (C1), and the consequent discharging of the fluid from the second chamber (C2), occurs in response to a command for rising the load, which causes the movement of the distributor (D) to the first position. The sending of the operating fluid to the second chamber (C2), and the consequent discharging of the fluid from the first chamber (C1), occurs in response to a command for lowering the load, which causes the movement of the distributor (D) to the second position.

In the absence of a control, the distributor (D) moves to a central position, in which none of the chambers (C1, C2) are fed with the operating fluid. According to the embodiment illustrated, the central position of the distributor (D) connects both the first conduit (10) and the second conduit (20) to the discharge.

Advantageously, the device according to the invention comprises a third balancing valve (13), positioned along the first conduit (10), which is normally closed and is actuated towards an open position by the pressure present in the second conduit (20). The third balancing valve (13) is positioned along the first conduit (10) in series with respect to the first balancing valve (11).

The third balancing valve (13) also comprises a by-pass (14) configured for allowing the direct flow towards the hydraulic actuator (C) and to prevent the opposite flow.

The third balancing valve (13) operates in a substantially simultaneous manner with the first balancing valve (11). In practice, the feeding of operating fluid to the second conduit (20), as well as determining the opening of the first balancing valve (11), also determines the opening of the third balancing valve (13), to allow the discharging of the operating fluid from the first chamber (C1).

The third balancing valve (13) offers extremely important safety advantages to the control device according to this invention.

In fact, in a low pressure condition in the second conduit (20), the first and the third balancing valves (11, 13) move to the closed position, occluding the first conduit (10) and preventing the discharge of operating fluid from the first chamber (C1). In the event of a malfunction of one of the two valves (11, 13), for example in the case of an incomplete closing of one of the two valves, the other valve is in any case able to guarantee the closing of the first conduit (10).

The use of two balancing valves (11, 13) along the first conduit (10) is particularly advantageous, in terms of safety, in the case in which the first conduit (10) is connected to the chamber of the hydraulic actuator designed for lifting and supporting a load. According to the embodiment illustrated, the chamber intended to lift and support the load is the first chamber (C1), that is to say, the chamber which, increasing its volume following the feeding of the operating fluid, determines the outwards movement of the rod (S). In effect, in that case, in the absence of any command by an operator, the hydraulic actuator must remain in a stationary condition, guaranteeing the stable maintaining of the load. For this to occur, the first chamber (C1) must not be emptied through the first conduit (10) which, therefore, must remain closed. The two balancing valves (11, 13) positioned along the first conduit, which in the absence of commands and under low pressure conditions in the second conduit (20) move to the closed position, offer a substantially certain guarantee of closing of the first conduit (10). This is even more important if the distributor (D) has an open centre, as in the embodiment illustrated, that is to say, if the distributor (D), in the central position, connects both the first conduit (10) and the second conduit (20) to the discharge.

According to the preferred but non-exclusive embodiment illustrated, the movement control device according to this invention comprises a first control conduit (p1), which places in communication the first balancing valve (11) and the second conduit (20). Moreover, the movement control device comprises a second control conduit (p2), which places in communication the second balancing valve (12) and the first conduit (10). A third control conduit (p3) is designed to place in communication the third balancing valve (13) and the second conduit (20).

The operation of the movement control device according to this invention takes place in the following modes.

In the presence of a command for raising or lifting the load, the distributor (D) moves to the first position, putting in connection the first conduit (10) with a source of pressurised operating fluid, for example a pump. The operating fluid reaches the first chamber (C1) passing through the by-passes (12, 14) along the first conduit (10). Simultaneously, the operating fluid present in the second chamber (C2) is discharged through the second conduit (20), following the thrust exerted by the piston (Sp). The flow discharged along the second conduit (20) is allowed by the opening of the second balancing valve (21), which adopts the open position due to the pressure present in the first conduit (10). The pressure present in the first conduit (10) is transmitted to the second balancing valve (21) through the second control conduit (p2).

In the presence of a command for the descent of the load, the distributor (D) moves to the second position, putting in connection the second conduit (20) with the source of pressurised operating fluid, for example a pump, and the first conduit (10) with the discharge. The operating fluid reaches the second chamber (C2) passing through the by-pass (22) along the second conduit (20). Simultaneously, the operating fluid present in the first chamber (C1) is discharged through the first conduit (10), following the thrust exerted by the piston (Sp). The flow discharging along the first conduit (10) is allowed by the opening of the first balancing valve (11) and of the third balancing valve (13). Both the valves (11, 13) adopt the open position in a substantially simultaneous manner, due to the pressure present in the second conduit (20). The pressure present in the second conduit (20) is transmitted to the first balancing valve (11) through the first control conduit (p1) and to the third balancing valve (13) through the third control conduit (p3).

If there is no control, the distributor (D) moves to the central position. In this condition, the first and the second conduits (10, 20) are connected to the discharge, and are therefore at low pressure, and the balancing valves (11, 12, 13) all move to the closed position.

According to the embodiment illustrated, the third control conduit (p3) is connected to the first control conduit (p1) and to the third balancing valve (13). In other words, the third control conduit (p3) is a branch of the first control conduit (p1). In some cases, this configuration simplifies the construction of the movement control device according to this invention.

Preferably, but not necessarily, each balancing valve (11, 12, 13) has the chamber for housing the closing spring positioned in communication with the outlet of the valve. According to other embodiments, not illustrated, the chamber for housing the spring is put in communication with a low pressure environment. For example, the chamber may be ventilated in air.

Advantageously, but not necessarily, the third balancing valve (13) is provided with an auxiliary conduit (131) which places in communication the chamber for housing the spring with a stretch of the first conduit (10) between the distributor (D) and the first balancing valve (11). This allows the first and the third balancing valves (11, 13) to react in a manner equal to the control pressure coming from the first and from the third control conduits (p1, p3). In this way, the first and the third balancing valves (11, 13) can be calibrated to the same opening pressure.

The solution described above relates to the case in which the resistant load on the cylinder applies an action which tends to move the rod (S) in.

In a case wherein the resistant load on the cylinder applies an action which tends to move the rod (S) out, the first conduit (10) is connected to the second chamber (C2), whilst the second conduit (20) is connected to the first chamber (C1), as shown in FIG. 2.

FIG. 3 shows a case wherein the cylinder (C) has two resistant loads, one which exerts an action which tends to move the rod (S) in, the other opposite, which exerts an action which tends to move the rod (S) out. In this case, the device according to the invention comprises a fourth balancing valve (24), positioned along the second conduit (20), which is normally closed and is actuated towards an open position by the pressure present in the first conduit (10).

The fourth balancing valve (24) is positioned along the second conduit (20) in series with respect to the second balancing valve (21).

The fourth balancing valve (24) also comprises a by-pass (25) configured for allowing the direct flow towards the hydraulic actuator (C) and to prevent the opposite flow.

The fourth balancing valve (24) operates in a substantially simultaneous manner with the second balancing valve (21). In practice, the feeding of operating fluid to the first conduit (10), which determines the opening of the second balancing valve (21), also determines the opening of the fourth balancing valve (24), to allow the discharging of the operating fluid from the second chamber (C2).

A fourth control conduit (p4) is designed for putting into communication the fourth balancing valve (24) and the first conduit (10). According to the embodiment illustrated, the fourth control conduit (p4) is connected to the second control conduit (p2) and to the fourth balancing valve (24). In other words, the fourth control conduit (p4) is a branch of the second control conduit (p2). In some cases, this configuration simplifies the construction of the movement control device according to this invention.

The advantages offered by the fourth balancing valve (24) are substantially the same as those already described with regard to the third balancing valve (13), but referred to the second control conduit (20) and to any malfunctions of the second balancing valve (21).

Advantageously, but not necessarily, the fourth balancing valve (24) is provided with an auxiliary conduit (241) which places in communication the chamber for housing the spring with a stretch of the second conduit (20) between the distributor (D) and the second balancing valve (21). This allows the second and the fourth balancing valves (21, 24) to react in a manner equal to the control pressure coming from the first and third control conduits (p2, p4). In this way, the first and the third balancing valves (21, 24) can be calibrated to the same opening pressure.

Advantageously, one or more of the balancing valves (11, 12, 21, 24) may be provided with a status detection, designed for emitting a signal indicating the open status of the respective valve. The status detection is particularly useful in particular for the third balancing valve (13), and also for the fourth balancing valve (24) if present, to indicate an unplanned and uncontrolled open condition, indicating a malfunction or the presence of impurities inside the circuit. The same advantage can obviously also be obtained for the other balancing valves.

According to a possible embodiment, not illustrated in detail, the detection of the status of a balancing valve comprises one or more sensors. For example, the sensors which can be used comprise LVDT-type linear movement sensors, designed for detecting the movement and/or the position of the shutter of the balancing valve. Moreover, the status detection may be provided with one or more pressure sensors, designed for measuring the pressure in the conduits for controlling the balancing valve.

The status detection can be associated with a control unit, provided with a monitoring algorithm, configured for detecting any malfunctions in which there is an unclosed position of one of the balancing valves despite the absence of control, and signalling any malfunction, for example to a display.

The invention claimed is:

1. Device for controlling movement of a load, comprising:
- a first conduit (10), designed to be connected to a first chamber (C1) of a hydraulic actuator (C);
- a second conduit (20) designed to be connected to a second chamber (C2) of the hydraulic actuator (C);
- a first balancing valve (11), positioned along the first conduit (10), which is normally closed and is actuated towards an open position by the pressure present in the second conduit (20);
- a second balancing valve (21), positioned along the second conduit (20), which is normally closed and is controlled towards an open position by the pressure present in the first conduit (10); and
- a third balancing valve (13), positioned along the first conduit (10), which is normally closed and is actuated towards an open position by the pressure present in the second conduit (20);
- a four-way and three-position distributor (D), connected to the first conduit (10) and to the second conduit (20), which is configured in such a way as to adopt a central position, in which an operating fluid is not supplied to the conduits (10, 20), a first position, in which the operating fluid is supplied to the first conduit (10), whilst the second conduit (20) is connected to a discharge, and a second position, in which the operating fluid is supplied to the second conduit (20), whilst the first conduit (10) is connected to the discharge;
- wherein the third balancing valve (13) is provided with an auxiliary conduit (131) which places in communication a chamber for housing a closing spring of the third balancing valve with a stretch of the first conduit (10) between the distributor (D) and the first balancing valve (11).

2. The device according to claim 1, comprising:
- a first control conduit (p1), which places in communication the first balancing valve (11) and the second conduit (20);
- a second control conduit (p2), which places in communication the second balancing valve (12) and the first conduit (10);

a third control conduit (p3), which places in communication the third balancing valve (13) and the second conduit (20).

3. The device according to claim 2, wherein the third control conduit (p3) is connected to the first control conduit (p1) and to the third balancing valve (13).

4. The device according to claim 1, wherein each balancing valve (11, 12, 13) comprises a respective by-pass (12, 22, 14), configured for allowing the direct flow towards the hydraulic actuator (C) and for preventing the opposite flow.

5. The device according to claim 1, wherein the distributor (D) is configured in such a way that, in the central position, the first and the second conduits (10, 20) are connected to the discharge.

6. The device according to claim 1, further comprising a fourth balancing valve (24), positioned along the second conduit (20), which is normally closed and is actuated towards an open position by the pressure present in the first conduit (10).

7. The device according to claim 6, comprising a fourth control conduit (p4), designed for putting into communication the fourth balancing valve (24) and the first conduit (10).

8. The device according to claim 6, wherein the fourth balancing valve (24) comprises a by-pass (25) configured for allowing the direct flow towards the hydraulic actuator (C) and to prevent the opposite flow.

9. Device for controlling movement of a load, comprising:

a first conduit (10), designed to be connected to a first chamber (C1) of a hydraulic actuator (C);

a second conduit (20) designed to be connected to a second chamber (C2) of the hydraulic actuator (C);

a first balancing valve (11), positioned along the first conduit (10), which is normally closed and is actuated towards an open position by the pressure present in the second conduit (20);

a second balancing valve (21), positioned along the second conduit (20), which is normally closed and is controlled towards an open position by the pressure present in the first conduit (10); and a third balancing valve (13), positioned along the first conduit (10), which is normally closed and is actuated towards an open position by the pressure present in the second conduit (20)

a first control conduit (p1), which places in communication the first balancing valve (11) and the second conduit (20);

a second control conduit (p2), which places in communication the second balancing valve (12) and the first conduit (10);

a third control conduit (p3), which places in communication the third balancing valve (13) and the second conduit (20);

wherein the third control conduit (p3) is connected to the first control conduit (p1) and to the third balancing valve (13), and the third control conduit (p3) is a branch of the first control conduit (p1).

* * * * *